United States Patent
Pothireddy et al.

(10) Patent No.: US 7,500,132 B1
(45) Date of Patent: Mar. 3, 2009

(54) METHOD OF ASYNCHRONOUSLY TRANSMITTING DATA BETWEEN CLOCK DOMAINS

(75) Inventors: Anil Pothireddy, Hyderabad, AP (IN); Kirtish Karlekar, Bangalore (IN); Grant D. Wheeler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/101,939

(22) Filed: Apr. 11, 2008

(51) Int. Cl.
*G06F 1/04* (2006.01)
(52) U.S. Cl. ...................................... 713/600; 713/400
(58) Field of Classification Search ................. 713/400, 713/500, 600
See application file for complete search history.

(56) References Cited

U.S. PATENT DOCUMENTS

| | | | |
|---|---|---|---|
| 5,548,620 A | | 8/1996 | Rogers |
| 5,602,878 A | * | 2/1997 | Cross ......................... 375/354 |
| 5,644,604 A | * | 7/1997 | Larson ........................ 375/354 |
| 5,793,227 A | | 8/1998 | Goldrian |
| 6,414,903 B1 | * | 7/2002 | Keeth et al. ............. 365/189.05 |
| 6,535,946 B1 | * | 3/2003 | Bryant et al. ................ 710/305 |
| 6,603,336 B1 | * | 8/2003 | Kessler et al. ............... 327/145 |
| 6,629,254 B1 | | 9/2003 | Naqvi et al. |
| 6,633,991 B1 | | 10/2003 | Goldrian |
| 6,799,280 B1 | * | 9/2004 | Edenfield et al. ............ 713/400 |
| 6,850,092 B2 | | 2/2005 | Chelcea et al. |
| 6,867,630 B1 | * | 3/2005 | Talledo et al. ............... 327/284 |
| 6,900,665 B2 | * | 5/2005 | Ma ............................... 326/94 |
| 6,906,555 B2 | * | 6/2005 | Ma ............................... 326/94 |
| 6,949,955 B2 | * | 9/2005 | Glasser ........................ 326/93 |
| 6,954,869 B2 | | 10/2005 | Syed |
| 7,010,713 B2 | * | 3/2006 | Roth et al. ................... 713/400 |
| 7,107,393 B1 | | 9/2006 | Sabih |
| 7,191,354 B2 | | 3/2007 | Purho |
| 7,296,174 B2 | | 11/2007 | Kelly |
| 7,363,526 B1 | | 4/2008 | Chong et al. |
| 2002/0087909 A1 | | 7/2002 | Hummel et al. |
| 2006/0106863 A1 | | 5/2006 | Ramasamy Venkatraj et al. |
| 2006/0274870 A1 | | 12/2006 | Wielage |
| 2006/0277329 A1 | * | 12/2006 | Paulson et al. ................ 710/39 |
| 2006/0282251 A1 | | 12/2006 | Schuppe |
| 2007/0064852 A1 | | 3/2007 | Jones et al. |
| 2007/0073877 A1 | | 3/2007 | Boykin et al. |
| 2007/0139085 A1 | | 6/2007 | Elliot et al. |
| 2007/0208980 A1 | * | 9/2007 | Gregorius et al. ........... 714/731 |
| 2008/0150605 A1 | | 6/2008 | Chueh et al. |

\* cited by examiner

*Primary Examiner*—Chun Cao
(74) *Attorney, Agent, or Firm*—Carpenter & Assoc.; Robert K. Carpenter

(57) ABSTRACT

A method of asynchronously transmitting data from a first clock domain to a second clock domain by transmitting the data from the first domain to a first register; after a first period of time, transmitting the data from the first register to a second register; after a second period of time, transmitting the data from the second register to a third register; and after a third period of time, transmitting the data from the third register to the second clock domain, where the first clock domain operates at a first frequency C1, and the second clock domain operates at a second frequency C2, C1 being faster than C2; and where: the first period of time is determined by C1; and the second and third periods of time are determined by a third frequency C3 that is greater than and a whole number multiple of C2.

5 Claims, 4 Drawing Sheets

METHOD OF ASYNCHRONOUSLY TRANSMITTING DATA BETWEEN CLOCK DOMAINS

BACKGROUND OF THE INVENTION

1. Field of the Invention

This invention generally relates to data transfer between asynchronous clock domains, and more specifically, to reducing the latency in such data transfers.

2. Background Art

Asynchronous data transfers have become very common in many integrated circuit devices, such as ASICs and SoCs, today. In particular, various components or subsystems utilized for the construction of an integrated circuit may independently operate at different frequencies, such as in microprocessors and micro-controllers, where certain components or subsystems have a faster rate of operation than the operating frequencies of other system components or subsystems. Therefore, typically, it is desirable to devise integrated circuits with the ability to support multiple domains, which may operate at different frequencies.

For instance, many integrated circuits include a number of electronic circuits referred to as "clocked logic domains" that operate independently based on electrical "timing" or "clock" signals. Such clock signals are used to control and coordinate the activities of various components or subsystems.

A particular device interface, or bus operating at a specific frequency, may define a distinct clocked logic domain. A variety of clocked systems may include one or more clock synthesizers, clock controllers or timers, such as a real time clock generator, an operating system timer, or an analog to digital converter controller that may require synchronizing transfer of multiple bits of data between asynchronous clock domains. However, synchronization of data transfer, particularly between various clocked logic domains, presents a number of problems.

While transferring digital data or signals between multiple clocked logic domains in a clocked system, one problem involves synchronization, such as by using storage elements or other hardware so that the timing of the digital data or signals transmitted is properly aligned at the receiving end. In doing so, the data or signals being transferred from one clocked logic domain may be delayed by one or more clock cycles so that the data or signals may be synchronized with the clock signals in another clocked logic domain, as an example. However, providing such synchronization may cause undesirable and sometimes unpredictable delays in the communications path or the data path. This may result in significant performance degradation and/or lack of data or signal integrity.

Since there will not be a fixed relationship between the active edge of the launch clock and the capture clock, there is a possibility of having setup or hold violations in the capture flip-flop, causing meta-stability. To avoid meta-stability in asynchronous data transfer, a commonly adopted technique is to double latch (also called double stage synchronization, or double flopping) the clock domain crossing signal at the receive domain clock frequency. Double flopping involves passing an asynchronous signal(s) through a pair of edge triggered D-Flip-flops or some equivalent storage element. If the receiving clock frequency is considerably less than the transmitting clock frequency, there is a huge latency involved in the double flopping process, often up to 20 or more clock cycles in the higher frequency domain. This situation frequently arises with slower devices, like a Flash Memory controller, being used in ASICs that have a majority of the components running at a much higher clock frequency.

Any reduction in the clock domain-crossing overhead tremendously reduces the data transfer latencies and increases the overall system performance.

SUMMARY OF THE INVENTION

An object of this invention is to reduce the latency in data transfer between asynchronous clock domains.

Another object of the present invention is to reduce crossing overhead in data transfer between asynchronous clock domains.

A further object of the invention is to run registers, which are used to transfer data between source and receiving clock domains, at a frequency that is source synchronized with the lower frequency clock of the receiving domain.

These and other objectives are attained with a method of, and an interfacing circuit for, transmitting data between a first clock domain operating at a first clock frequency C1 and a second clock domain operating at a second clock frequency C2. In accordance with this invention, data is transmitted from the first domain, through an interfacing circuitry, and to the second domain. The interfacing circuitry includes a synchronization section that operates at a third frequency C3, wherein C3 is a whole number multiple of C2. For example, C3 may be an even whole number multiple of C2.

In the preferred embodiment, a clock signal A is used to operate the second clock domain at frequency C2, and a clock signal B is used to operate the second section of the interfacing circuitry at frequency C3. Each of the clock signals A and B have regular, active edge portions, and each occurrence of one of the active edge portions of clock signal A is clock aligned with one of the active edge portions of clock signal B. In particular, in this preferred embodiment, clock signals A and B are source synchronized.

Preferably, the synchronization section of the interfacing circuitry includes first and second registers. Clock signal B is applied to both the first and second registers to operate these registers at frequency C3.

For example, in an asynchronous data transfer, the higher clock frequency that launches data may be C1 and the lower clock frequency that captures data may be C2. In accordance with this invention, the interface flip-flops used for double flopping run at a higher source synchronous clock frequency C3. C3 is source synchronized with the low frequency clock C2, and C3 and C2 will always have a common active edge and will be considered synchronous. Since each occurrence of the active edge of the capture clock (the slow clock) will have the active edge of the source synchronous clock aligned with it, there will not be a chance of meta-stability occurring. Clocks are typically classified as source synchronous if they are derived from the same phase locked loop (PLL) and are in phase.

With this preferred embodiment of the invention, the higher the frequency of clock C3, the less the latency becomes. The limitation on the upper limit for a source synchronous clock C3 is the minimum clock period needed to overcome the meta-stability, as stated in the flip-flop specification.

In an embodiment of the invention described below in detail, by using a source synchronous clock running at a higher (say 8X) frequency to double flop the signal at the interface, the latency is reduced to about 8 clock cycles in the receive clock frequency (compared to a latency of 25 clock cycles without using this technique). There is about a 70% improvement in the latency, which enhances the overall system performance. The data transfer rates across the asynchronous interface are tremendously improved.

In particular, at least some aspects and embodiments of this disclosure are directed to a method of asynchronously transmitting data from a first clock domain to a second clock domain, the method including: transmitting the data from the first domain to a first register; after a first period of time, transmitting the data from the first register to a second register; after a second period of time, transmitting the data from the second register to a third register; and after a third period of time, transmitting the data from the third register to the second clock domain, where the first clock domain operates at a first frequency C1, and the second clock domain operates at a second frequency C2, C1 being faster than C2; and where: the first period of time is determined by C1; and the second and third periods of time are determined by a third frequency C3 that is greater than and a whole number multiple of C2. In at least some aspects and embodiments of this disclosure, C3 is an even whole number multiple of C2. In at least some aspects and embodiments of this disclosure, C3 is less than C1. In at least some aspects and embodiments of this disclosure, C2 is determined by applying clock signal A to the second clock domain, and C3 is determined by applying clock signal B to the second and third registers. In at least some aspects and embodiments of this disclosure, clock signals A and B are source synchronized.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
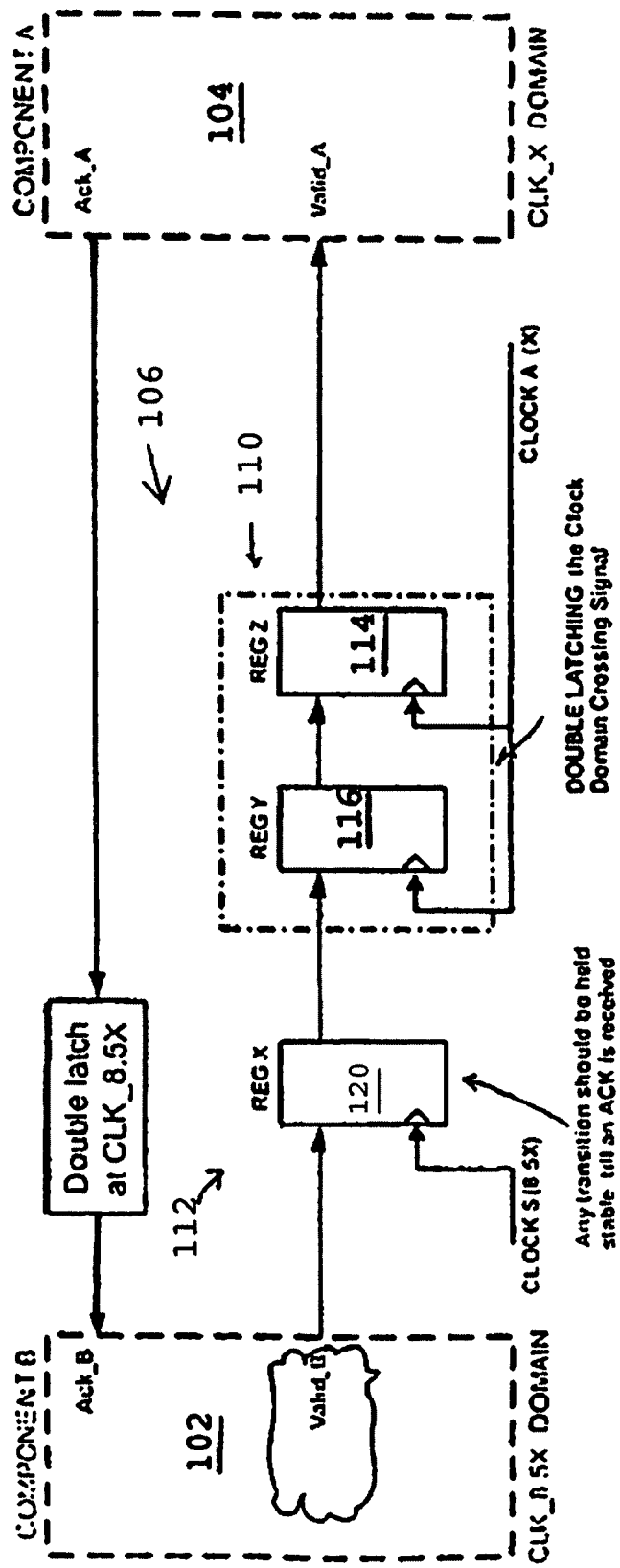
FIG. 1 is a block diagram illustrating two asynchronous clock domains and a prior art procedure for transmitting data between the domains.
Figure 2:
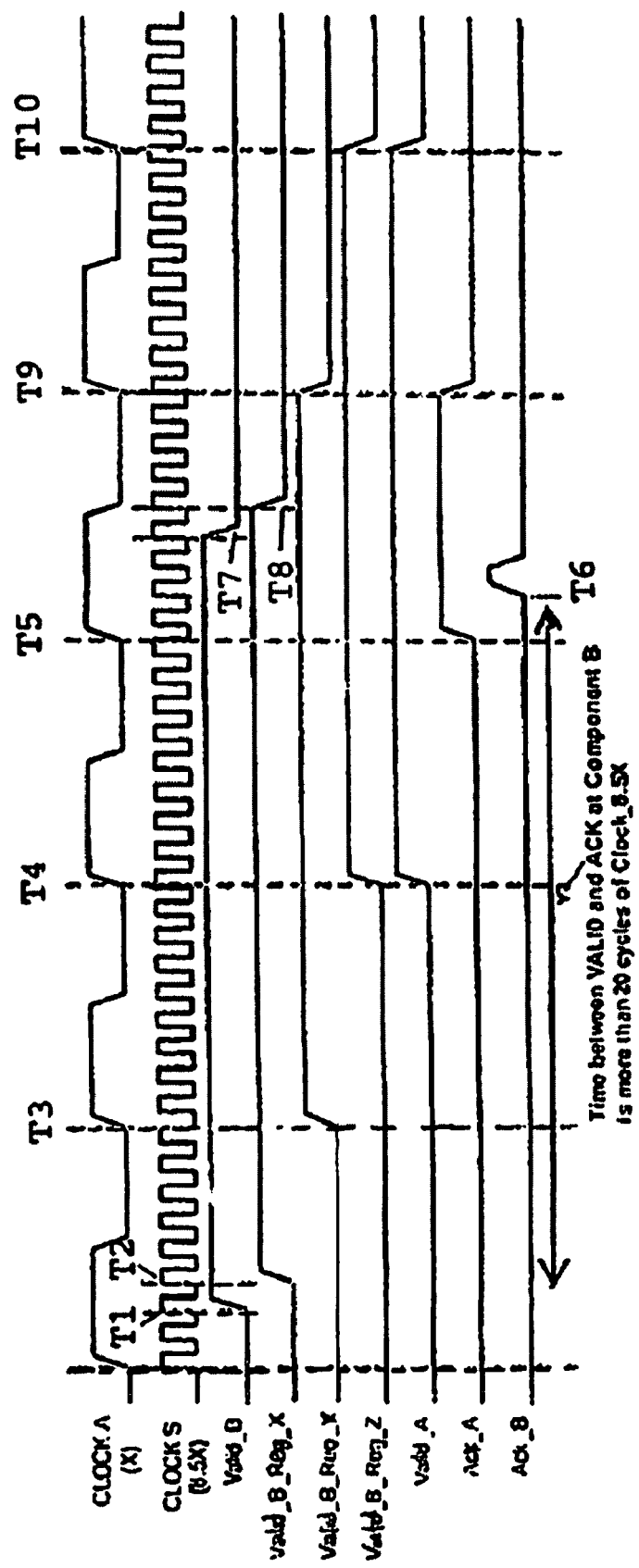
FIG. 2 is a timing diagram showing the timing of signals and data transmitted in the system of FIG. 1.

FIGS. 1 and 2 illustrate a prior art scheme that compensates for asynchronous data transfers between source and destination domains. In particular, system 100 includes source domain 102, destination domain 104, and interface circuitry 106 that connect the source domain to the destination domain. Interface circuitry, in turn, includes a first section 110 and a second section 112. More specifically, with system 100 shown in FIG. 1, first section 110 includes a first register 114 and a second register 116, and second section 112 includes a third register 120. Destination domain 104 operates at a clock frequency X, and this domain is thus referred to as the CLK X domain. Source domain 102 operates at a clock frequency 8.5 X, and this domain is referred to as the CLK 8.5 X domain.

The destination domain is controlled by a clock signal referred to as Clock A, and the source domain is controlled by a clock signal referred to as Clock S. In the example system 100 of FIG. 1, the source domain may comprise a high speed device configuration register (DCR), whereas the destination domain may comprise a low speed peripheral device such as an interface to a Flash memory.

In the embodiment shown in FIG. 1, section 112 of the interfacing circuitry 106 includes a register 120 for synchronizing the data bit signals (or a control signal that qualifies the data bits) with the source clock frequency (Clock S). The register 120 represents any type of a storage component including a D-Flip-flop or any similar type of edge triggered storage element. The output of register 120 is synchronized to the Clock S.

The Registers 114 and 116 receive the data bit signals (or a control signal that qualifies the data bits) from register 120, and are used for double flopping the clock domain crossing signal(s). The Registers 114 and 116 represent any type of a storage component including a D-Flip-flop or any similar type of edge triggered storage element. In system 100. Registers 114 and 116 operate at a frequency X.

FIG. 2 illustrates clock signals A and S and also shows a signal being transmitted through system 100 of FIG. 1. As can be seen, at time T1, the Valid B signal from clock domain 102 goes high: and this signal is latched by Register 120 at the next rising edge of clock S, which occurs at time T2. Valid B from Register 116 then goes high at the next rising edge of clock A, at time T3. Valid B from Register 114 and the Valid A at Component A belonging to the clock domain 104 goes high at the next rising edge of clock A, which occurs at time T4.

The Ack A signal of clock domain 104 goes high at time T5, which occurs at the next rising edge of clock A. This Ack A signal is applied to source domain 102, and is double flopped with the Clock S and appears as Ack B at the component B, at time T6. Valid B then goes low at time T7; and Valid B from Register 120 goes low at the next rising edge of clock S. at time T8. Valid B from Register 116 goes low at the next rising edge of clock A, which occurs at time T9; and Valid B from Register 114 and Valid A at Component A both go low at the next rising edge of clock A, which occurs at time T10.

With the above described procedure, by double latching at the receive clock frequency, there is a latency of about 25 clock cycles in the transmit clock domain, in the example where the clocks frequency ratio is 8.5X and X. The latency could be more or less depending on the ratio of the clock frequencies.

Figure 3:
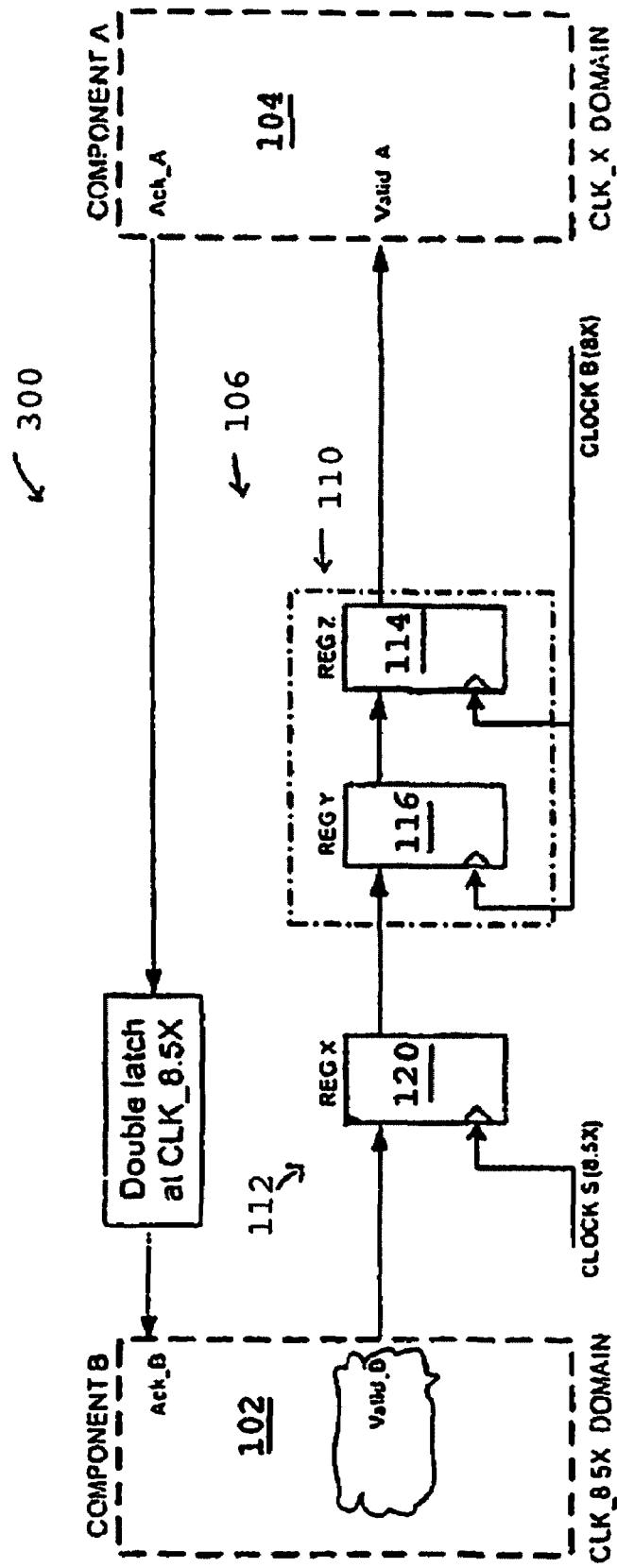
FIG. 3 is a block diagram showing the clock domains of FIG. 1 and a procedure embodying the present invention for transmitting data between the domains.
Figure 4:
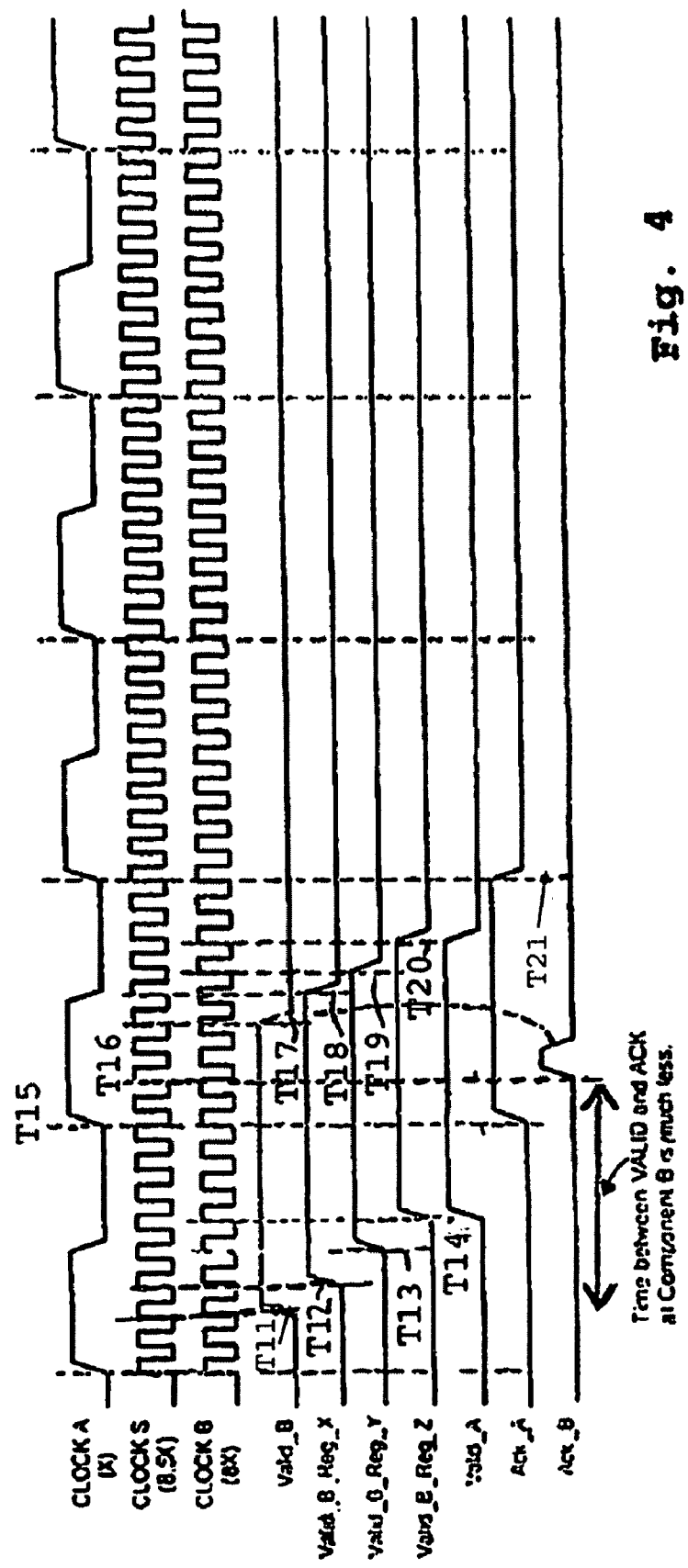
FIG. 4 is a timing diagram showing the timing of signal and data transmitted in the system of FIG. 3 in accordance with the present invention.

FIGS. 3 and 4 illustrate the advantages of the present invention.

In particular, FIG. 3 shows a system 300 including the clock domains 102 and 104 and the Registers 114, 116 and 120 of FIG. 1; but as illustrated in FIG. 3, a procedure embodying the present invention is used to transmit data between the clock domains. As illustrated in FIG. 3, Register 120 operates at a clock frequency of 8.5 X; however, Registers 114 and 116 operate at a clock frequency of 8.0 X. This frequency is provided by a clock signal B; and, as discussed in more detail below, clock signal B is preferably source synchronized with clock signal A.

FIG. 4 illustrates clock signals A, B and S and also shows a signal transmitted through system 300 of FIG. 3. As can be seen, at time T11, the Valid B signal of source domain 102 goes high; and this signal is latched by Register 120 at the next rising edge of clock signal S, which occurs at time T12. Valid B from Register 116 then goes high at the next rising edge of clock B, at time T13. Valid B from Register 114 and the Valid A of destination domain 103 then go high at the next rising edge of clock B, which occurs at time T14.

The Ack A signal of destination domain 104 goes high at time T15, which occurs at the next rising edge of clock A. This Ack A signal from clock domain 104 is double flopped with the Clock S and appears as Ack B at the source domain at time T16. Valid B of source domain 102 then goes low at the next rising edge of clock S, at time T17; and Valid B from Register 120 goes low at the next rising edge of clock S, at time T18. Valid B from Register 116 goes low at the next rising edge of clock B, which occurs at time T19; and Valid B from Register 114 and Valid A of destination domain 104 both go low at the next rising edge of clock B, which occurs at time T20. Ack A then goes low at the next rising edge of signal A, at time T21.

By using a source synchronous clock running at a higher (say 8X) frequency to double latch the signal at the interface, the latency is reduced to about 8 clock cycles in the receive clock frequency (compared to a latency of 25 clocks without using this technique). There is about a 70% improvement in the latency; which enhances the overall system performance. The data transfer rates across the asynchronous interface are tremendously improved.

Using a synchronous clock running at a higher frequency to double flop at the asynchronous boundary reduces the double flopping latency to a considerable extent.

Usually, the source synchronous clock will be an even multiple of the receive domain clock (lower freq clock, X), i.e., 2X, 4X, 6X, 8X, etc. The highest possible frequency will be determined by the minimum time needed by the flip-flop to overcome the meta-stability, as specified in the manufacturer's specification.

It should be noted that, while two D-flip-flops are shown in the preferred embodiment, the invention could be extended to any number (one or more) of flip-flops in the section of the interfacing circuitry operating at the third frequency C3. Also, any edge (rising or falling) can be used as an active edge trigger for any of the synchronizing flip-flops described in the interfacing circuitry. In addition, register 120 may be considered optional in cases where it is known that the asynchronous signal is directly launched off an edge triggered storage element in the Component B.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

We claim:

1. A method of asynchronously transmitting data from a first clock domain to a second clock domain, the method comprising:

transmitting the data from the first domain to a first register; after a first period of time, transmitting the data from the first register to a second register; after a second period of time, transmitting the data from the second register to a third register; and after a third period of time, transmitting the data from the third register to the second clock domain, wherein the first clock domain operates at a first frequency C1, and the second clock domain operates at a second frequency C2, C1 being faster than C2; and wherein:

the first period of time is determined by C1; and the second and third periods of time are determined by a third frequency C3 that is greater than and a whole number multiple of C2.

2. The method of claim 1, wherein C3 is an even whole number multiple of C2.

3. The method of claim 1, wherein C3 is less than C1.

4. The method of claim 3, wherein C2 is determined by applying clock signal A to the second clock domain, and C3 is determined by applying clock signal B to the second and third registers.

5. The method of claim 4, wherein clock signals A and B are source synchronized.

* * * * *

UNITED STATES PATENT AND TRADEMARK OFFICE
CERTIFICATE OF CORRECTION

PATENT NO. : 7,500,132 B1  
APPLICATION NO. : 12/101939  
DATED : March 3, 2009  
INVENTOR(S) : Anil Pothireddy et al.

Page 1 of 1

It is certified that error appears in the above-identified patent and that said Letters Patent is hereby corrected as shown below:

On the title page, item (75) is incorrect –  
Inventor "Grant D. Wheeler" should be --David Grant Wheeler--.

Signed and Sealed this  
Nineteenth Day of March, 2013

Teresa Stanek Rea  
*Acting Director of the United States Patent and Trademark Office*